United States Patent
Schober et al.

(10) Patent No.: US 10,999,831 B2
(45) Date of Patent: May 4, 2021

(54) IMPROVING SLOW DOWNLINK CONTROL INFORMATION RELIABILITY

(71) Applicant: NOKIA SOLUTIONS AND NETWORKS OY, Espoo (FI)

(72) Inventors: Karol Schober, Helsinki (FI); Klaus Hugl, Vienna (AT)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 10 days.

(21) Appl. No.: 16/336,281

(22) PCT Filed: Sep. 29, 2016

(86) PCT No.: PCT/EP2016/073278
§ 371 (c)(1),
(2) Date: Mar. 25, 2019

(87) PCT Pub. No.: WO2018/059693
PCT Pub. Date: Apr. 5, 2018

(65) Prior Publication Data
US 2019/0230634 A1    Jul. 25, 2019

(51) Int. Cl.
*H04W 72/04* (2009.01)

(52) U.S. Cl.
CPC ...... *H04W 72/042* (2013.01); *H04W 72/0446* (2013.01)

(58) Field of Classification Search
CPC .................................................. H04W 72/042
See application file for complete search history.

(56) References Cited

U.S. PATENT DOCUMENTS

| | | | |
|---|---|---|---|
| 2016/0128028 A1 | 5/2016 | Mallik et al. | |
| 2017/0230994 A1* | 8/2017 | You | H04W 72/042 |
| 2017/0332397 A1* | 11/2017 | Li | H04L 1/1887 |
| 2018/0049166 A1* | 2/2018 | Sun | H04W 72/042 |
| 2019/0082457 A1* | 3/2019 | Zhou | H04L 5/0053 |
| 2020/0053707 A1* | 2/2020 | Babaei | H04W 72/042 |

OTHER PUBLICATIONS

International Search Report & Written Opinion dated Jun. 22, 2017 corresponding to International Patent Application No. PCT/EP2016/073278.
Nokia et al: "On two-level DL control channel design for shorter TTI operation," 3GPP Draft; R1-167082, 3GPP TSG-RAN WG1 Meeting #86, Gothenburg, Sweden, Aug. 12, 2016, XP051132305.
(Continued)

*Primary Examiner* — Jason E Mattis
(74) *Attorney, Agent, or Firm* — Squire Patton Boggs (US) LLP

(57) ABSTRACT

The present invention addresses a method, apparatus and computer program product for improving slow DCI reliability. Thereby, with regard to a subframe including slow downlink control information, an indication element indicating that the slow downlink control information transmitted in this subframe has the same content as slow downlink control information in the previous subframe or one of the past subframes is generated, and the indication element is transmitted in the same subframe and the same downlink control channel candidate as the slow downlink control information to a user equipment.

20 Claims, 8 Drawing Sheets

(56) References Cited

OTHER PUBLICATIONS

Qualcomm Incorporated: "DL channel design for shortened TTI," 3GPP Draft; R1-164458, 3GPP TSG RAN WG1 #85, Nanjing, China, May 14, 2016, XP051096436.
Ericsson: "DCI for sTTI scheduling," 3GPP Draft; R1-165294, 3GPP TSG-RAN WG1 #85, Nanjing, P.R. China, May 13, 2016, XP051096742.
Feb. 3, 2020 Communication pursuant to Article 94(3) EPC issued in European Patent Application No. 16775675.8.

\* cited by examiner

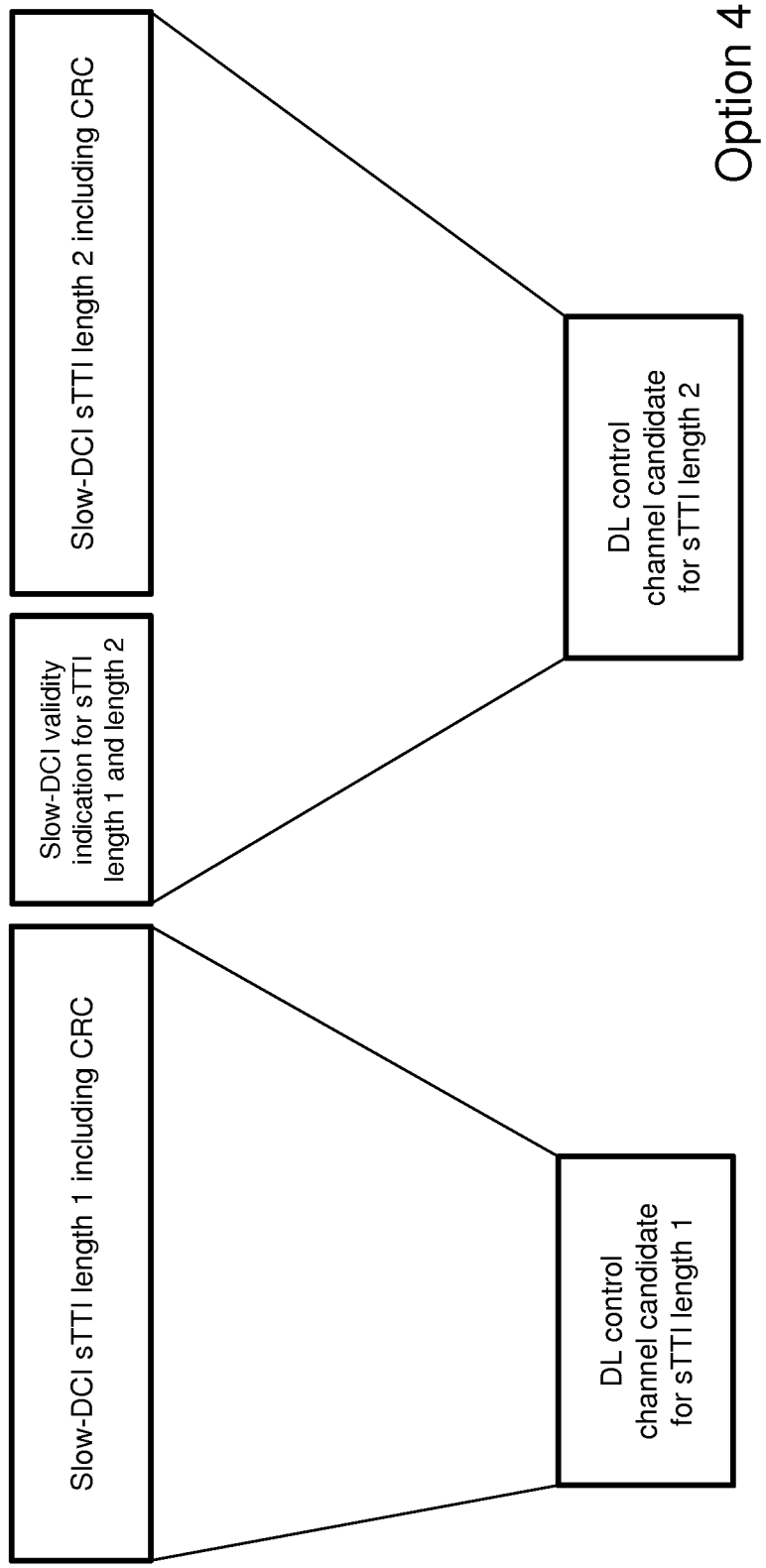

IMPROVING SLOW DOWNLINK CONTROL INFORMATION RELIABILITY

FIELD OF THE INVENTION

The present invention generally relates to communication networks, and more specifically relates to methods, apparatuses and computer program products for improving slow downlink control information DCI reliability.

BACKGROUND

Mobile data transmission and data services are constantly making progress, wherein such services provide various communication services, such as voice, video, packet data, messaging, broadcast, etc. In recent years, Long Term Evolution LTE™, and in particular LTE-Advanced™, has been specified, which uses the Evolved Universal Terrestrial Radio Access Network E-UTRAN as radio communication architecture according to 3GPP specification.

Recently, LTE-Advanced Pro system is under discussion (cf. 3GPP LTE Rel. 14/15), wherein one of the issues according to this system is "shortened transmission time interval TTI and processing time for LTE". In this regard, the present invention generally focuses on Latency reduction in such system.

One of the above objectives is to specify support for short physical downlink control channel sPDCCH, i.e. PDCCH for short TTI. In document R1-167082 (3GPP TSG-RAN WG1 meeting #86), a two stage-DCI has been proposed, wherein the downlink control information DCI is split into a slow-DCI and a fast-DCI. The slow DCI is transmitted in the legacy PDCCH once a subframe and determines at least one of the resources used for operation of short TTI in downlink and/or uplink and the resources of sPDCCH, where the fast DCIs are transmitted. Fast DCIs can be transmitted in every short TTI (sTTI) and schedules sPDSCH and sPUSCH.

However, the dependency between the slow DCI and the fast DCI may decrease reliability of the DCI as whole. If a user equipment (UE) does not receive the slow-DCI in a subframe, it cannot receive any sTTI within the subframe neither as e.g. the resources of sPDCCH is not known to the UE.

Therefore, there is a need for a solution that improves reliability of slow-DCI reception.

SUMMARY OF THE INVENTION

Therefore, in order to overcome the drawbacks of the prior art, it is an object underlying the present invention for improving slow Downlink Control Information reliability.

In particular, it is an object of the present invention to provide a method, apparatus and computer program product for improving the slow Downlink Control Information reliability.

This object is achieved by a method, apparatus and computer program product as defined in the accompanying claims.

That is, it is a basic idea of the present invention to transmit a separate indication together with the slow-DCI on a DL control channel resource, if the slow-DCI information from the previous subframe is still valid or not.

According to a first aspect of the present invention, there is provided a method performed by a base station, comprising generating, with regard to a subframe including slow downlink control information, an indication element indicating that the slow downlink control information transmitted in this subframe has the same content as slow downlink control information in the previous subframe or one of the past subframes, and causing transmission of the indication element in the same subframe and the same downlink control channel candidate as the slow downlink control information to a user equipment.

According to a second aspect of the present invention, there is provided an apparatus implemented in a base station, comprising at least one processor; and at least one memory for storing instructions to be executed by the processor, wherein the at least one memory and the instructions are configured to, with the at least one processor, cause the apparatus at least to perform generating, with regard to a subframe including slow downlink control information, an indication element indicating that the slow downlink control information transmitted in this subframe has the same content as slow downlink control information in the previous subframe or one of the past subframes, and causing transmission of the indication element in the same subframe and the same downlink control channel candidate as the slow downlink control information to a user equipment.

According to a third aspect of the present invention, there is provided a method performed in a user equipment, comprising receiving, from a base station, a message including slow downlink information, wherein, an indication element is contained in the same subframe and the same downlink control channel candidate as the slow downlink control information, and the indication element indicating that the slow downlink control information transmitted in this subframe has the same content as slow downlink control information in the previous subframe or one of the past subframes.

According to a fourth aspect of the present invention, there is provided an apparatus implemented in a user equipment, comprising at least one processor; and at least one memory for storing instructions to be executed by the processor, wherein the at least one memory and the instructions are configured to, with the at least one processor, cause the apparatus at least to perform receiving, from a base station, a message including slow downlink information, wherein, an indication element is contained in the same subframe and the same downlink control channel candidate as the slow downlink control information, and the indication element indicating that the slow downlink control information transmitted in this subframe has the same content as slow downlink control information in the previous subframe or one of the past subframes.

According to a fifth aspect of the present invention, there is provided a computer program product comprising computer-executable components which, when the program is run, are configured to carry out the method according to the first and/or third aspect.

Advantageous further developments or modifications of the aforementioned exemplary aspects of the present invention are set out in the dependent claims.

According to certain embodiments of the present invention, the indication element is a 1-bit signaling.

According to certain embodiments of the present invention, the number of bits for the indication element is configured. Alternatively, the number of bits for the indication element is predetermined, such as given by specification. Thereby, according to certain embodiments of the invention, the indication element is mapped on one or more resource elements and/or one or more resource element groups of the downlink control channel candidate.

According to certain embodiments of the present invention, the downlink control channel candidate may be configured to the user equipment (e.g. in high layer).

Still further, according to certain embodiments, for legacy operation in which downlink control information is using all the resources of a downlink control channel candidate, part of the resources are mapped to the indication element for signaling the slow downlink control information validity, whereas the remaining resources are used to contain the slow downlink control information.

According to certain embodiments of the invention, the slow downlink control information as well as the indication element of each short transmission time interval length is independently signaled on a differently configured downlink control channel candidate. Alternatively, separate slow downlink control information elements, one for each short transmission time interval length, are provided on separate downlink control channel candidates, and the indication element on each candidate includes also the indication element for at least one other short transmission time interval length. Alternatively, separate slow downlink control information elements, one for each short transmission time interval length, are provided on separate downlink control channel candidates, and independent indication elements for several short transmission time interval lengths is placed within one physical downlink control channel candidate carrying the slow downlink control information of one of the short transmission time interval lengths.

According to certain embodiments with regard of the above first aspect of the invention, the method further comprising signaling, in each subframe, the slow downlink control information and/or the indication element with respect to the last valid downlink subframe to the user equipment, wherein, in case the slow downlink control information content is the same as in the last valid subframe, the indication element indicates the validity, in case the slow downlink control information has been changed or slow downlink control information has not been transmitted before, the indication element indicates that the last valid slow downlink control information is not valid any longer, and in case the slow downlink control information is not transmitted and the indication element indicates that the last valid slow downlink control information is not valid any longer, indicating to the user equipment that a short transmission time interval operation in this subframe is disabled.

According to certain embodiments with regard of the above third aspect of the invention, in case the user equipment is able to decode a slow downlink control information within the message, the indication element is disregarded, and in case the user equipment is not able to decode or find a slow downlink control information, the user equipment observes the indication element, wherein, if the indication element indicates validity of the content of the slow downlink control information, the short transmission time interval is operated according to the previous slow downlink control information, and if the indication element indicates not valid any longer, short transmission time intervals in the subframe are not processed any longer.

BRIEF DESCRIPTION OF DRAWINGS

For a more complete understanding of example embodiments of the present invention, reference is now made to the following descriptions taken in connection with the accompanying drawings in which:

FIG. 7 is an exemplary illustration of Option 4 for the case of more than one sTTI length operation (described later);

DESCRIPTION OF EXEMPLARY EMBODIMENTS

Figure 1:
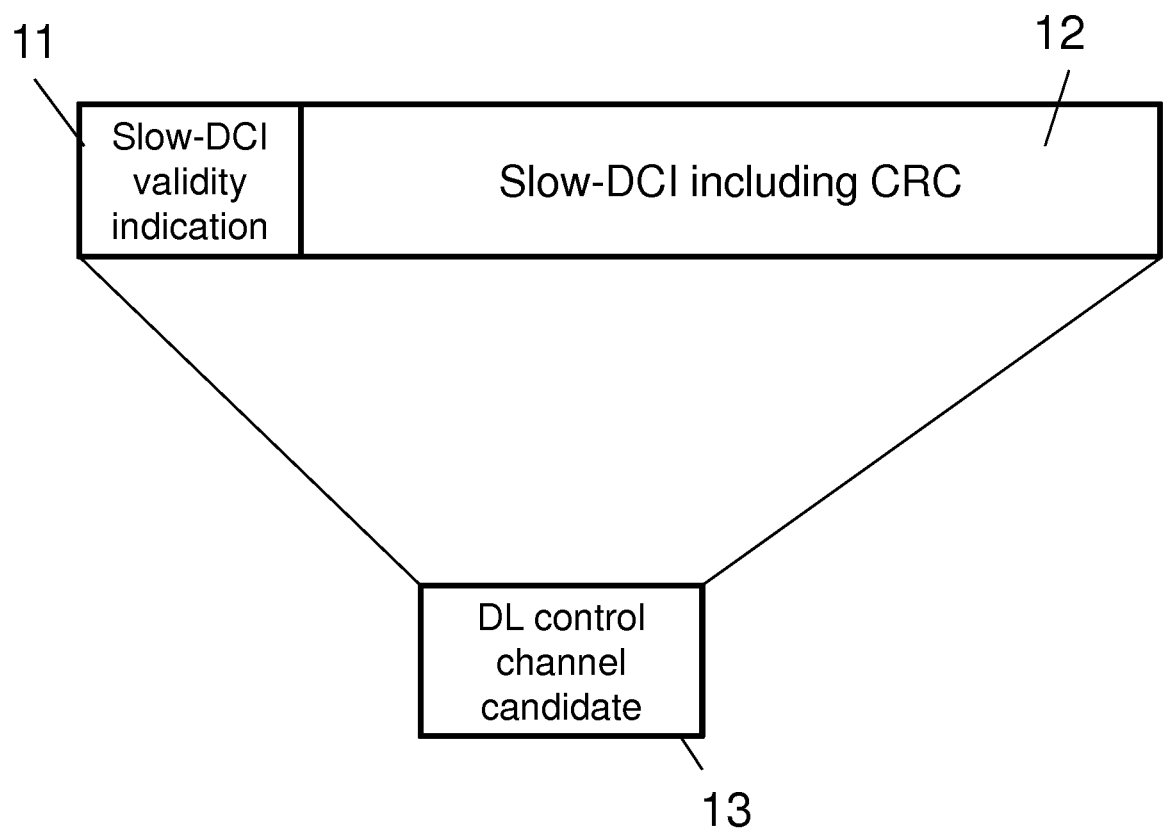
FIG. 1 shows a mapping of slow-DCI validity indication as well as slow DCI to a DL control channel candidate.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refer to specifications being used as non-limiting examples for certain exemplary network configurations and deployments. Namely, the present invention and its embodiments are mainly described in relation to 3GPP as well as LTE (including LTE-A and LTE-A pro) specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives. Also, the favorable execution order of features, procedures may differ in different deployments or implementations.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

As already indicated above, in the two stage-DCI as referred to in document 3GPP R1-167082, the DCI is split into a slow-DCI and a fast-DCI. The slow DCI is transmitted in the legacy PDCCH once a subframe and determines the resources used by short TTI (i.e. sTTI band) as well asl the resources of sPDCCH, where the fast DCIs are transmitted. Fast DCIs can be transmitted in every short TTI and schedule sPDSCH and sPUSCH.

Thereby, the two-stage DCI has several advantages. That is, firstly, the eNB may adapt size of overall available DL control resources on subframe bases through the slow DCI signaling. In addition, the eNB may signal unused DL control resources with the fast DCI and may therefore enable usage of unused DL control resources on a sTTI bases. These two features being the key enabler of control overhead reduction.

Furthermore, the two-level design supports fully flexible (on subframe bases) frequency selective DL multiplexing of sTTI users with legacy TTI users.

Still further, slow-DCI can be used as an ON/OFF switch of sTTI operation on a subframe to subframe bases. For example, a UE configured for sTTI operation but not receiving the slow-DCI for that sTTI length can switch OFF the sTTI related processing, leading to power savings as e.g unnecessary sTTI DL control decoding would not be required.

Moreover, slow-DCI can be used to assign (at least) a DL sTTI band being smaller than the overall DL carrier bandwidth. The resource allocation signaling in the fast DCI DL assignment can then more efficiently signal the DL sTTI resource allocation with a limited number of resource allocation bits, as the set of candidate PRBs is only a subset of the overall number of PRBs of the DL carrier.

According to the present invention, an (as example, but not limited thereto: 1-bit signaling) indication is transmitted in the same subframe and the same DL control channel candidate as the slow-DCI. This indication element (e.g. 1-bit) indicates that the slow DCI transmitted in this subframe has the same content as the slow DCI transmitted in the previous subframe or one of the past subframes.

According to certain embodiments, this single bit (when received) allows the UE to receive sills in the subframe even if the UE did not decode the slow DCI correctly. Furthermore, it allows the UE to combine LLRs of the DCI transmitted in previous subframe (or one of the past subframes) and in the current subframe, and such significantly improve the reliability of the slow-DCI.

While two-stage DCI allows adaptation of sTTI band and control resources of sPDCCH on the subframe bases. However, in practice, the slow DCI may not change every subframe, and this fact could be exploited for improving slow DCI reliability.

In particular, the basic idea is to transmit a separate indication together with the slow-DCI on a DL control channel resource, if the slow-DCI information from the previous subframe is still valid or not (information content basically 1 bit).

In contrast to current operation, this is to be transmitted on single DL control resource. FIG. 1 shows an example mapping here of the data to be transmitted on the DL control resource.

In particular, FIG. 1 shows mapping of slow-DCI validity indication 11 as well as slow DCI (including cyclic redundancy check 12) to DL control channel candidate 13 (e.g. on PDCCH CSS).

For legacy operation, a DCI is using all the resources of a DL control channel candidate. In this hybrid approach, part of the resources are mapped to signal the slow-DCI validity (still valid or not) and the remaining resources are used to contain the slow DCI.

In order to improve the reliability of slow-DCI validity indication, the information content of basically 1 bit (still valid/not valid any more) can be improved by using several resource element(s) REs of even resource element groups REGs of the DL control channel candidate by several different simple coding methods.

On the one hand, as repetition coding, the 1 bit information content is just repeated X−1 times to improve the reliability. On the other hand, some simple other coding scheme, such as Reed-Muller coding, resulting in a bitstream of X-bit can be applied to improve the reliability of 1-bit signalling.

Preferably, the size X of the slow-DCI validity information is a multiple of the REG size of 4 REs in order to enable efficient multi-antenna transmission TX diversity as used on PDCCH. The size of X might moreover be higher-layer configured in order for the evolved NodeB eNB to trade-off the overhead due to the validity signaling with respect to the reliability of the slow-DCI signaling.

For the operation to further improve the reliability and decrease the required processing at the UE side, the DL control channel candidate (e.g. on PDCCH CSS) can be higher layer configured to the UE.

Figure 2A:
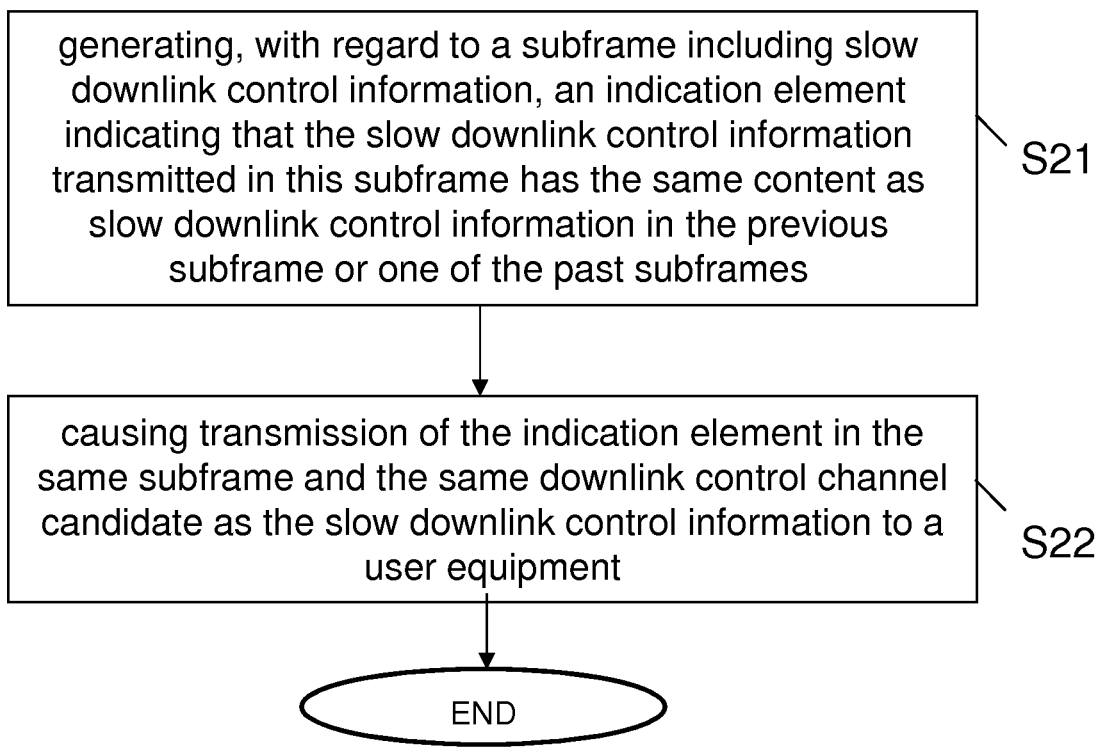
FIGS. 2a and 2b each illustrates a method according to certain embodiments of the invention, wherein FIG. 2a refers to a method performed in a base station, and FIG. 2b refers to a method performed in a user equipment.
Figure 2B:
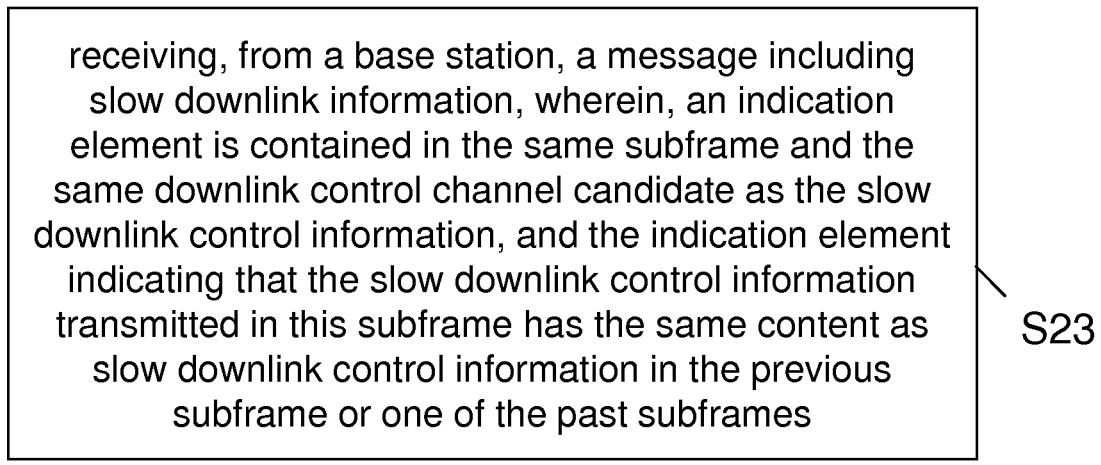

FIGS. 2a and 2b each illustrates a method according to certain embodiments of the invention, wherein FIG. 2a refers to a method performed in a base station, and FIG. 2b refers to a method performed in a user equipment In Step S21 in FIG. 2a, with regard to a subframe including slow downlink control information, an indication element indicating that the slow downlink control information transmitted in this subframe has the same content as slow downlink control information in the previous subframe or one of the past subframes is generated.

In Step S22 in FIG. 2a, transmission of the indication element in the same subframe and the same downlink control channel candidate as the slow downlink control information to a user equipment is caused.

Moreover, in S23 in FIG. 2b, a message including slow downlink information is received from a base station, wherein an indication element is contained in the same subframe and the same downlink control channel candidate as the slow downlink control information, and the indication element indicating that the slow downlink control information transmitted in this subframe has the same content as slow downlink control information in the previous subframe or one of the past subframes.

Figure 3A:
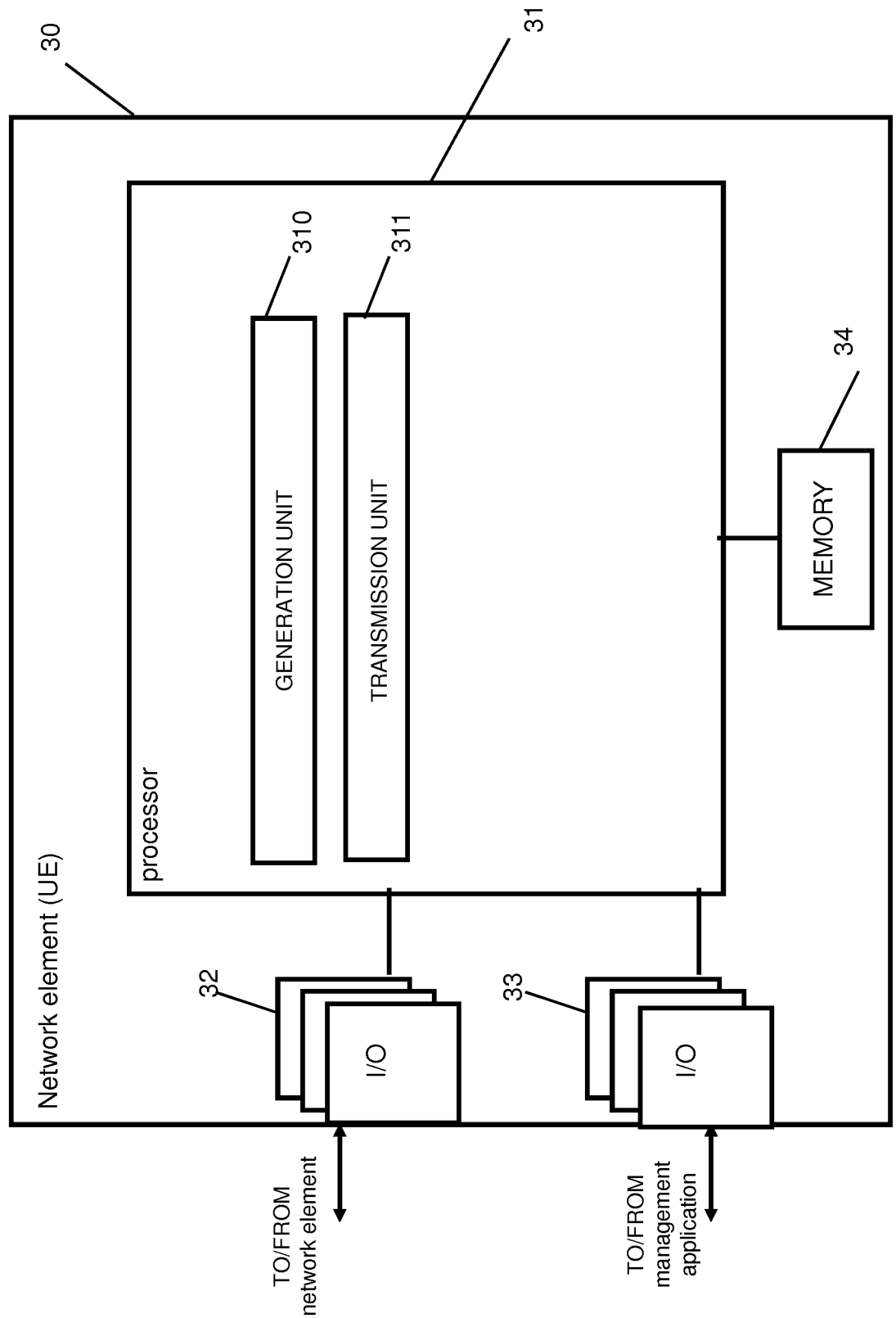
FIGS. 3a and 3b schematically show simplified configurations as per embodiments of the invention, with a base station and a user equipment connected to the base station.
Figure 3B:
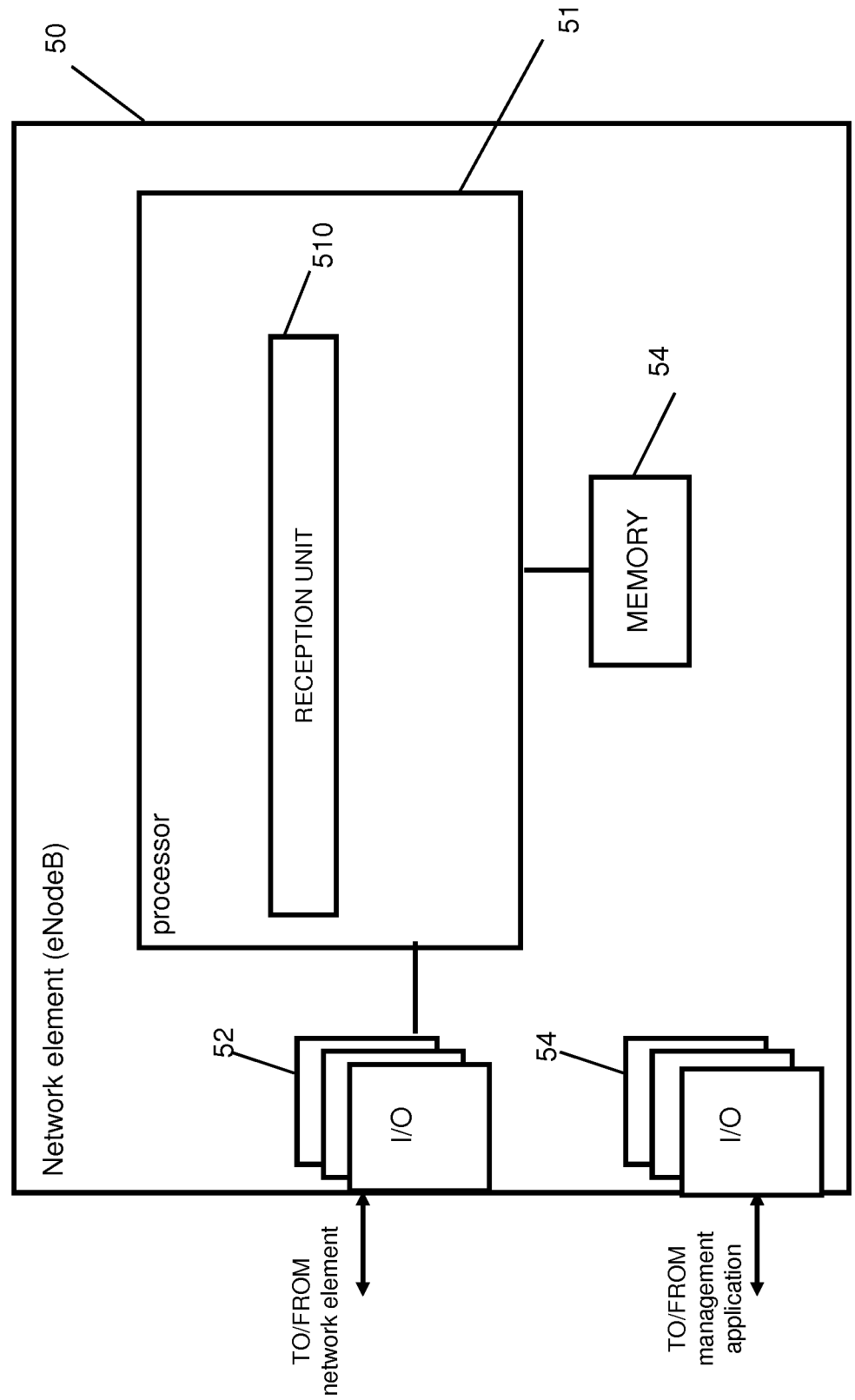

FIGS. 3a and 3b schematically shows a simplified configuration as per embodiments of the invention, with a base station and a user equipment connected to the base station.

In FIGS. 3a and 3b, diagrams illustrating a configuration of an element comprised in a network element, such as a user equipment operable in LTE-A (FIG. 3a) and a base station eNodeB operable in LTE-A (FIG. 3b), according to some example versions of the disclosure is shown, which are configured to implement improving slow DCI reliability described in connection with some of the example versions of the disclosure. The embodiments may be carried out in or by the network element (e.g. UE/eNodeB). It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 30, 50 shown in FIGS. 3a and 3b, respectively, may comprise a processing function, control unit or processor 31, 51, such as a CPU or the like, which is suitable for executing instructions given by programs or the like related to the network element control procedure.

In FIG. 3a, the processor 31 is configured to execute processing related to the above described method performed by a user equipment. In particular, the processor 31 comprises a sub-portion 310 as a generation unit configured to generate, with regard to a subframe including slow downlink control information, an indication element indicating that the slow downlink control information transmitted in this subframe has the same content as slow downlink control information in the previous subframe or one of the past subframes. The portion 310 may be configured to perform processing according to S21 of FIG. 2a. Furthermore, the processor 31 comprises a sub-portion 311 usable as a transmission unit configured to cause transmission of the indication element in the same subframe and the same downlink control channel candidate as the slow downlink control information to a user equipment. The portion 311 may be configured to perform processing according to S22 of FIG. 2a.

Reference signs 32, 52 and 33, 53 denote transceiver or input/output (I/O) units (interfaces) connected to the processor 31, 51. The I/O units 32, 52 may be used for communicating with the network element. The I/O units 33, 53 may be used for communicating with a management application. Reference sign 34, 54 denotes a memory usable, for example, for storing data and programs to be executed by the processor 31, 51 and/or as a working storage of the processor 31, 51.

In FIG. 3b, the processor 51 comprises a sub-portion 510 as a reception unit configured to receive, from a base station, a message including slow downlink information, wherein an indication element is contained in the same subframe and the same downlink control channel candidate as the slow downlink control information, and the indication element indicating that the slow downlink control information transmitted in this subframe has the same content as slow downlink control information in the previous subframe or one of the past subframes. The portion 510 may be configured to perform processing according to S23 of FIG. 2b.

In the following, an implementation of a base station, such as eNB, according to certain embodiments of the invention is explained.

As part of the sTTI configuration, the eNB configures also the number of bits X for the validity indication as well as the PDCCH control channel candidate to carry the slow-DCI as well as the validity indication to the UE. Thereby, in each subframe, the eNB signals the slow-DCI and or the validity indication with respect to the last indication (i.e. last valid DL subframe) to the UEs.

In case the slow-DCI content is the same in the last valid subframe, the validity indication shows still valid (or logical 1 or similar). In case the slow-DCI content has been changing or slow DCI was not transmitted before, the validity indication show that the last valid slow-DCI is not applicable/valid any longer (logical 0 or similar). In case the slow-DCI is not transmitted and the validity indication shows that the last valid slow-DCI is not applicable/valid any longer (logical 0 or similar), the eNB indicates to the UE that sTTI operation in this particular subframe is switched OFF. The eNB operates the two-step scheduling for shorter TTI otherwise.

In the following, an implementation of a user equipment as a network element according to certain embodiments of the invention is explained.

The UE receives as part of the shorter TTI operation configuration the number of bits X for the slow-DCI validity indication as well as the PDCCH control channel candidate to carry the slow-DCI as well as the slow-DCI validity indication. Then, the UE monitors on the higher-layer configured PDCCH control channel candidate for the slow-DCI as well as slow-DCI validity indication of size X.

In case the UE is able to decode a slow-DCI, the UE may proceed with sTTI operation within the current subframe and does not necessarily need to look at the validity indication. In case the UE is not able to decode/find a slow-DCI, the UE is looking at the validity indication.

If the validity indication indicates 'still valid' the UE assumes the slow-DCI information from the last valid DL subframe to be still valid and operates sTTI according to the previous slow-DCI information. If UE did neither correctly decode the slow-DCI in the last valid subframe, it may benefit from combining reception of the candidate in current and previous subframe.

If the validity indication indicates 'not valid any longer', the UE does not have valid sTTI operation information for the subframe and will not process the DL sTTIs in the subframe any longer. This can be also used by the eNB to actively trigger sTTI on/off for UE power savings by indicating slow-DCI not valid any longer and not transmit the corresponding slow-DCI in the subframe.

It is to be noted, that the above description of embodiments basically assumed that a UE is only configured with a single DL short TTI length. But in a cell there may be more than one DL sTTI length operational for different UEs or even the same UE. For completeness of the solution the following the procedure described above can be also applied to several different sTTI lengths as follows.

Figure 4:
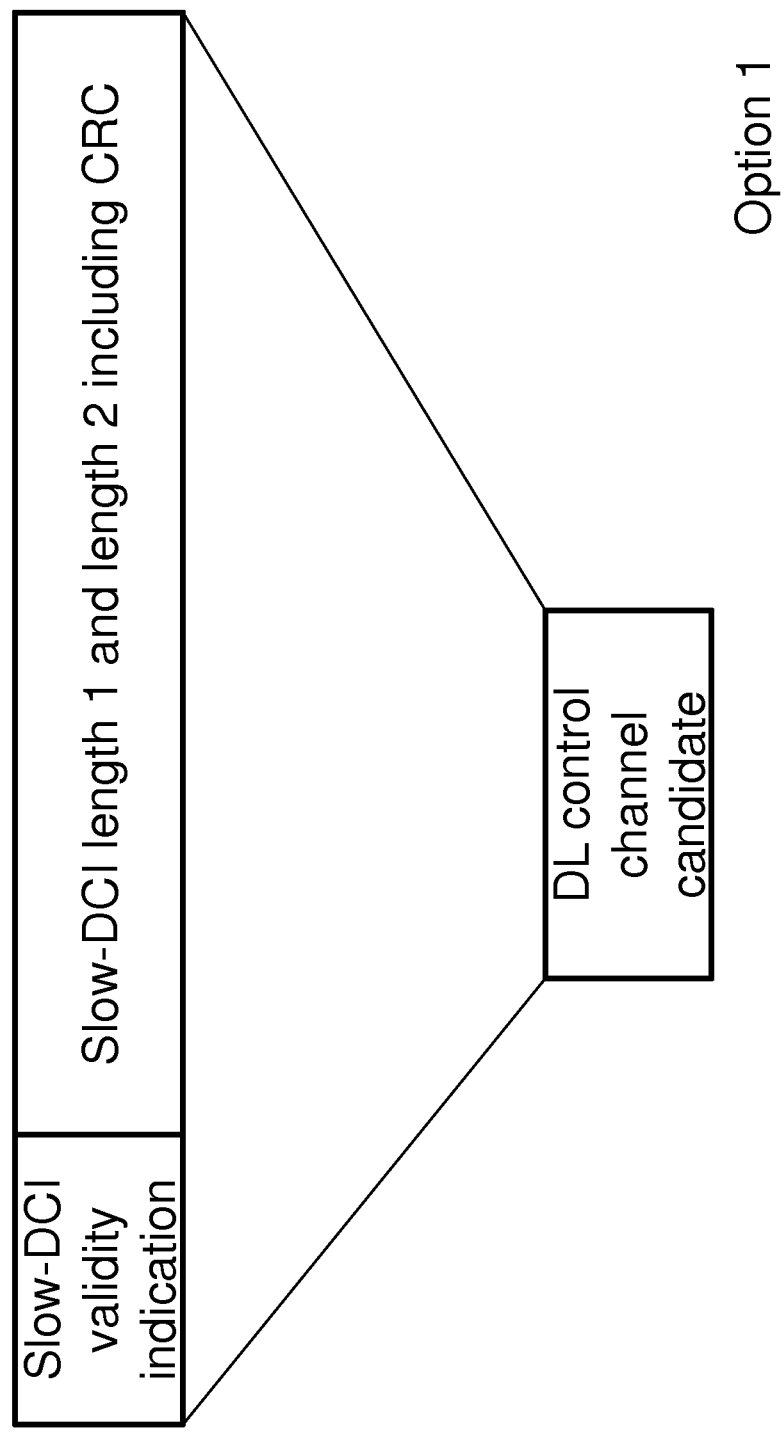
FIG. 4 is an exemplary illustration of Option 1 for the case of more than one sTTI length operation (described later)

Option 1—joint slow-DCI information for all the configured sTTI lengths and joint validity indication: In this case the sTTI operation information is contained in a single slow-DCI, as shown in FIG. 4. Therefore, the higher-layer configured single DL control channel candidate contains the 1 bit information of the slow-DCI validity—the only difference is that the slow-DCI itself contains the information for more than one DL sTTI length.

Figure 5:
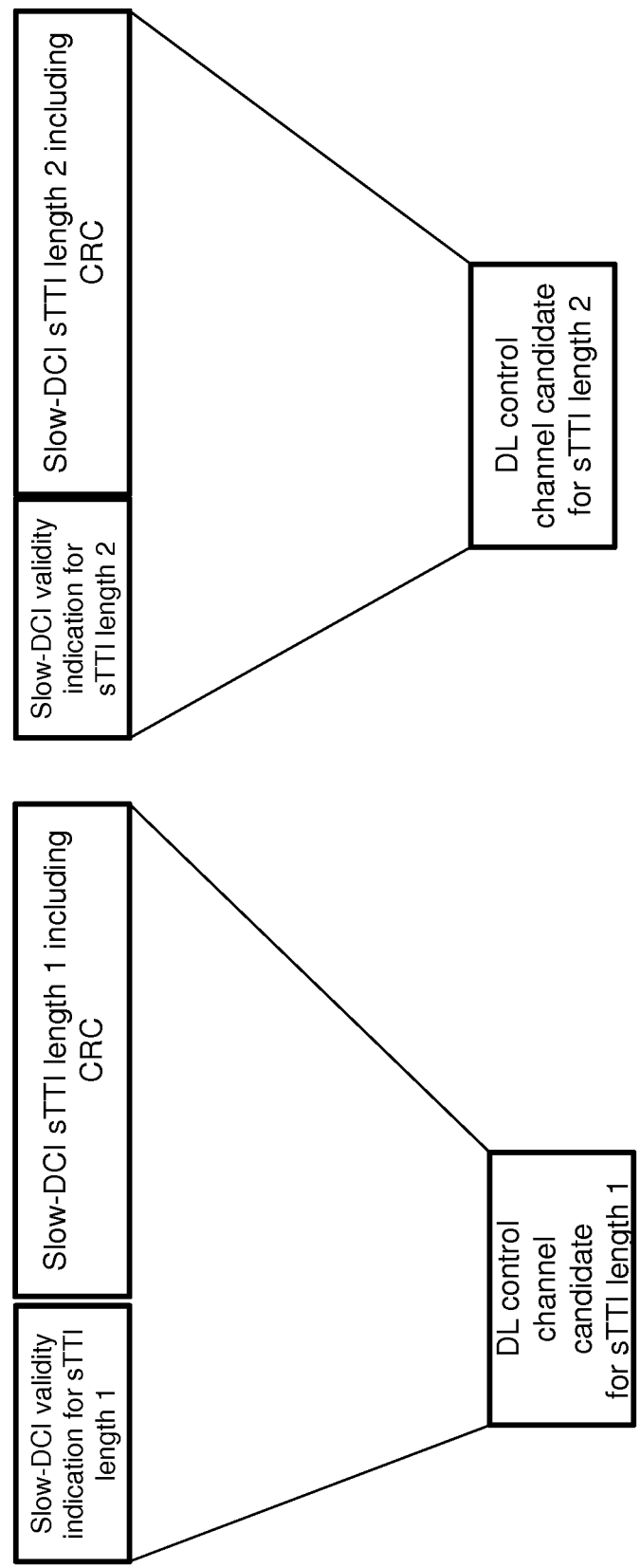
FIG. 5 is an exemplary illustration of Option 2 for the case of more than one sTTI length operation (described later)

Option 2—separate sTTI operation indication for each configured sTTI length (separate slow-DCI and validity indication): In this case, the slow-DCI information as well as slow-DCI validity information of each (DL) sTTI length is independently signalled on a differently configured DL control channel resource, as shown in FIG. 5. Therefore, the operation mentioned above is separately operational for each sTTI length.

Option 3—separate slow-DCI information and joint/repeated slow-DCI validity indication: For this operation, there are different slow DCIs on separate DL control channel candidates—but the slow-DCI validity information on each candidate might include the indication also for other sTTI length, as shown on the example in FIG. 6. Therefore, the validity indication would contain the independent validity information for more than one sTTI length. E.g. for 2 sTTI lengths 2 logical bits will be needed (validity/no validity sTTI length 1, validity/no validity sTTI length 2) and are mapped to the X bits in total. Of course, this operation would need to be higher layer configured as well.

Figure 6:
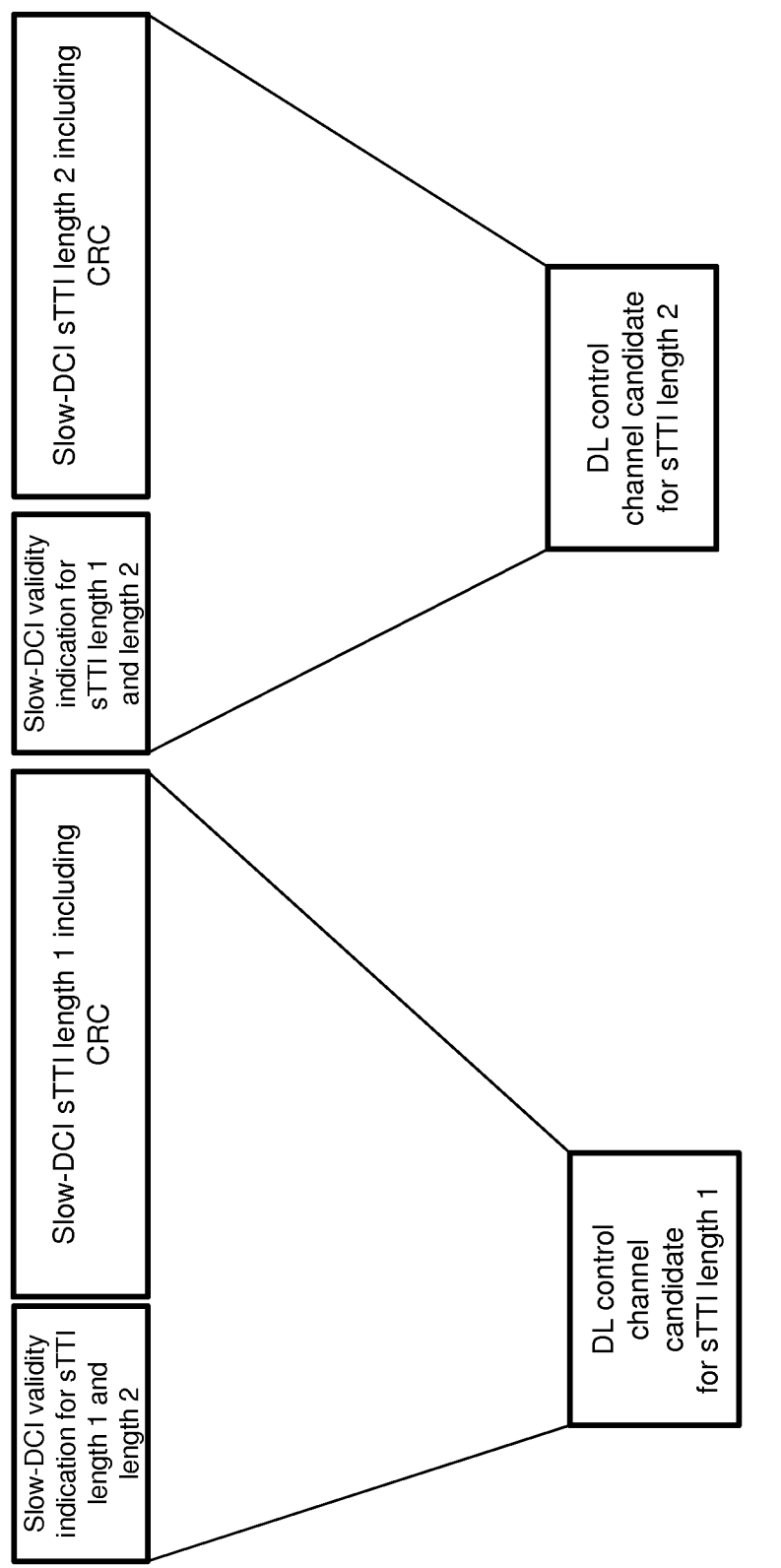
FIG. 6 is an exemplary illustration of Option 3 for the case of more than one sTTI length operation (described later)

An advantage of this Option compared to Option 2 would be that additional diversity can be created as the validity information in addition is to be contained on two different higher-layer configured DL control channel candidates. This is illustrated in FIG. 6.

Option 4—separate slow-DCI information and a single slow-DCI validity indication in one of the PDCCH candidates carrying a slow DCI: In this case the independent validity information for several sTTI length is placed only within one PDCCH candidate carrying the slow-DCI, as shown in FIG. 7.

Compared to Option 2, the X additional bits of validity indication increase the coding rate of only a single slow-DCI. For example, if a low latency service of the shortest sTTI length is not provided at the cell edge, the DCI of the shortest length can be the best candidate to carry the additional X bits of validity indication. Furthermore, if one slow-DCI is mapped on a DL control candidate having a smaller aggregation level (AL) and the other slow-DCI on a higher AL DL control candidate, the higher AL candidate would be the better choice to carry the additional X bits of validity indication.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:

3GPP Third Generation Partnership Program
AL Aggregation Level
CSS Common Search Space
CRC Cyclic Redundancy Check
DCI Downlink Control Information
DL, D Downlink
eNB Enhanced NodeB
EPDCCH Enhanced Physical Downlink Control Channel
FDD Frequency Division Duplexing
FDM Frequency Division Multiplexing
LLR Log Likelihood Ratio
LTE Long Term Evolution
(s)PDCCH (Short) Physical Downlink Control Channel
(s)PDSCH (Short) Physical Downlink Shared Channel
PHI CH Physical HARQ-ACK Indicator Channel
(s)PUCCH (Short) Physical Uplink Control Channel
PRB Physical resource block
(s)PUSCH (Short) Physical Uplink Shared Channel
RAN Radio Access Network
Rel Release
RE Resource Element
REG Resource Element Group
SI Study Item
TSG Technical Steering Group
TX Transmission
(s)TTI (Short) Transmission Time Interval
UE User Equipment
WG Working Group
WI Work Item

What is claimed is:

1. A method, comprising:
generating, with regard to a subframe including slow downlink control information, an indication element indicating that the slow downlink control information transmitted in this subframe has the same content as another slow downlink control information in a previous subframe or past subframes, wherein the slow downlink control information is mapped to a downlink control channel candidate;
mapping the indication element to the same downlink control channel candidate as the slow downlink control information; and
causing transmission of the indication element in the same subframe as the slow downlink control information to a user equipment.

2. The method according to claim 1, further comprising configuring the number of bits for the indication element as well as the physical downlink control channel candidate to carry the slow downlink control information as well as the indication element to the user equipment.

3. The method according to claim 2, wherein the indication element is a 1-bit signaling.

4. The method according to claim 2, wherein the indication element comprises a resource element or a resource element group of the downlink control channel candidate.

5. The method according to claim 4, wherein a size of the slow downlink control information is a multiple of a resource element group size of four resource elements.

6. The method according to claim 4, wherein a size of the slow downlink control information is high-layer configured.

7. The method according to claim 6, wherein the downlink control channel candidate is higher layer configured to the user equipment.

8. The method according to claim 7, further comprising signaling, in each subframe, the slow downlink control information or the indication element with respect to the last valid downlink subframe to the user equipment, wherein
in case the slow downlink control information content is the same as in the last valid subframe, the indication element indicates the validity;
in case the slow downlink control information has been changed or slow downlink control information has not been transmitted before, the indication element indicates that the last valid slow downlink control information is not valid any longer; and
in case the slow downlink control information is not transmitted and the indication element indicates that the last valid slow downlink control information is not valid any longer, indicating to the user equipment that a short transmission time interval operation in this subframe is disabled.

9. The method according to claim 8, wherein, for legacy operation in which downlink control information is using all the resources of a downlink control channel candidate, part of the resources are mapped to signal the slow downlink control information validity, whereas the remaining resources are used to contain the downlink control information.

10. An apparatus, comprising:
at least one processor; and
at least one memory for storing instructions to be executed by the processor, wherein
the at least one memory and the instructions are configured to, with the at least one processor, cause the apparatus at least to perform the method according to claim 1.

11. A method, comprising:
receiving, from a base station, a message including a slow downlink control information, wherein the slow downlink control information is received in a subframe and is mapped to a downlink control channel candidate,
and an indication element, wherein the indication element is mapped to the same downlink control channel candidate as said slow downlink control information,
wherein the indication element is received in the same subframe as the slow downlink control information, and
wherein the indication element indicates that the slow downlink control information transmitted in said subframe has the same content as slow downlink control information received in a previous subframe or one of the past subframes.

12. The method according to claim 11, further comprising receiving, as part of a short transmission time interval operation configuration, a number of bits for the indication element as well as the physical downlink control channel candidate to carrying the indication element as well as the slow downlink control information.

13. The method according to claim 11, wherein the indication element is a 1-bit signaling.

14. The method according to claim 12, wherein the indication element comprises a resource element or a resource element group of the downlink control channel candidate.

15. The method according to claim 14, wherein a size of the slow downlink control information is a multiple of the resource element group size of four resource elements.

16. The method according to claim 14, wherein a size of the slow downlink control information is high-layer configured.

17. The method according to claim 16, wherein the downlink control channel candidate is higher layer configured to a user equipment.

18. The method according to claim 17, wherein,
in case the user equipment is able to decode a slow downlink control information within the message, the indication element is disregarded, and
in case the user equipment is not able to decode or find a slow downlink control information, the user equipment observes the indication element, wherein
if the indication element indicates validity of the content of the slow downlink control information, the short transmission time interval is operated according to the previous slow downlink control information, and
if the indication element indicates not valid any longer, short transmission time intervals in the subframe are not processed any longer.

19. The method according to claim 18, wherein, for legacy operation in which downlink control information is using all the resources of a downlink control channel candidate, part of the resources are mapped to signal the slow downlink control information validity, whereas the remaining resources are used to contain the downlink control information.

20. An apparatus, comprising:
at least one processor; and
at least one memory for storing instructions to be executed by the processor, wherein
the at least one memory and the instructions are configured to, with the at least one processor, cause the apparatus at least to perform the method according to claim 11.

* * * * *